United States Patent
Lev et al.

(10) Patent No.: US 8,665,593 B2
(45) Date of Patent: Mar. 4, 2014

(54) SUPPORT TRAY INCLUDING A PLATFORM AND A BODY PROVIDING A CAVITY

(75) Inventors: Jeffrey A. Lev, Tomball, TX (US); Paul J Doczy, Cypress, TX (US); Dustin L. Hoffman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 13/054,830

(22) PCT Filed: Aug. 12, 2008

(86) PCT No.: PCT/US2008/072842
§ 371 (c)(1),
(2), (4) Date: Jan. 19, 2011

(87) PCT Pub. No.: WO2010/019133
PCT Pub. Date: Feb. 18, 2010

(65) Prior Publication Data
US 2011/0121776 A1    May 26, 2011

(51) Int. Cl.
*H05K 5/00*    (2006.01)
(52) U.S. Cl.
USPC .................. 361/679.55; 320/114; 320/115
(58) Field of Classification Search
USPC .............. 320/114, 115; 361/679.55
See application file for complete search history.

(56) References Cited

U.S. PATENT DOCUMENTS

| | | | | |
|---|---|---|---|---|
| 5,535,093 A | * | 7/1996 | Noguchi et al. | 361/679.43 |
| 5,627,450 A | | 5/1997 | Ryan et al. | |
| 5,883,820 A | * | 3/1999 | Ota et al. | 361/679.55 |
| 6,040,681 A | * | 3/2000 | May | 320/113 |
| 6,222,728 B1 | * | 4/2001 | Jaggers et al. | 361/679.41 |
| 6,259,601 B1 | * | 7/2001 | Jaggers et al. | 361/690 |
| 6,301,106 B1 | * | 10/2001 | Helot et al. | 361/679.55 |
| 6,309,230 B2 | * | 10/2001 | Helot | 439/131 |
| 6,833,988 B2 | * | 12/2004 | Kamphuis et al. | 361/679.41 |
| 7,068,503 B2 | * | 6/2006 | Kamimaki et al. | 361/679.55 |
| 7,130,190 B1 | * | 10/2006 | Baker | 361/695 |
| 7,199,999 B2 | * | 4/2007 | Shin et al. | 361/679.55 |
| 7,307,834 B2 | * | 12/2007 | Jones et al. | 361/679.55 |
| 7,330,349 B2 | * | 2/2008 | Chen et al. | 361/679.41 |
| 8,030,889 B2 | * | 10/2011 | Tamura et al. | 320/112 |
| 2005/0111171 A1 | * | 5/2005 | Kamimaki et al. | 361/679 |
| 2006/0108483 A1 | * | 5/2006 | Wolff et al. | 248/122.1 |
| 2006/0289444 A1 | | 12/2006 | Jackson et al. | |
| 2007/0049071 A1 | | 3/2007 | Jackson | |
| 2008/0002369 A1 | * | 1/2008 | Carnevali | 361/724 |

OTHER PUBLICATIONS

International Searching Authority, International Search Report and The Written Opinion dated May 4, 2009, Appln No. PCT/US2008/072842, pp. 11.

* cited by examiner

*Primary Examiner* — Yalkew Fantu
*Assistant Examiner* — Manuel Hernandez

(57) ABSTRACT

In one embodiment, a support tray that may be used in a notebook computer charging system includes a body adapted to support a power adapter, and a platform extending out from the body, the platform being adapted to support a notebook computer.

19 Claims, 4 Drawing Sheets

SUPPORT TRAY INCLUDING A PLATFORM AND A BODY PROVIDING A CAVITY

CROSS-REFERENCE TO RELATED APPLICATION

This application is a national stage application under 35 U.S.C. §371 of PCT/US2008/072842, filed on Aug. 12, 2008.

BACKGROUND

It is sometimes necessary to charge multiple notebook computers simultaneously. For example, a school may need to charge each night a group of notebook computers used by a given class of students.

Charging racks are available in the market that are intended for storing and charging multiple notebook computers. Unfortunately, use of such racks can be inconvenient. For example, given the nature of such racks, it can be difficult and/or time consuming to locate the power cables that are to be plugged into the computers for charging, particularly when those power cables fall behind the rack.

BRIEF DESCRIPTION OF THE DRAWINGS

The disclosed systems can be better understood with reference to the following drawings. The components in the drawings are not necessarily to scale.

DETAILED DESCRIPTION

As described above, existing notebook computer charging racks can be inconvenient to use. Disclosed herein are notebook computer charging systems that can be used with relative ease. As described below, the charging systems are modular and therefore can be specifically configured to suit the user's needs. In some embodiments, the system comprises multiple support trays, each being adapted to support a notebook computer and an associated power adapter. The support trays are stackable to enable the user to build a system that can charge a desired number of notebook computers. In embodiments in which the power adapters have jacks that extend perpendicularly outward, the notebook computers can be directly connected to the power adapters, thereby obviating the need to locate and connect power cables.

Figure 1:
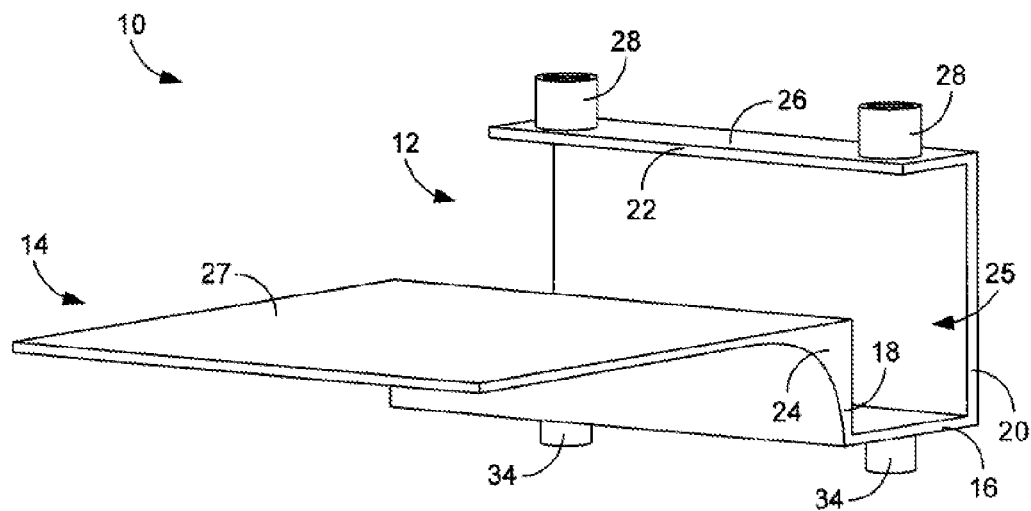
FIG. 1 is a perspective view of an embodiment of a support tray of a notebook computer charging system that is adapted to support a computing device and an associated power adapter.
Figure 2:
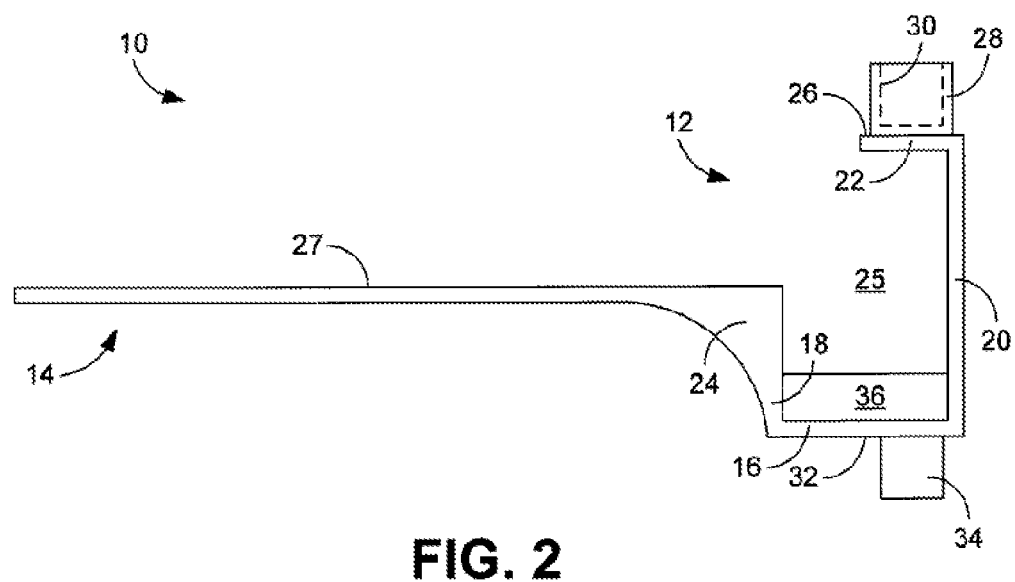
FIG. 2 is a side view of the support tray of FIG. 1.

Referring now in more detail to the drawings in which like numerals identify corresponding parts throughout the views, FIGS. 1 and 2 illustrate a support tray 10 that can form part of a notebook computer charging system. As indicated in those figures, the support tray 10 generally comprises a body 12 that is adapted to support a power adapter and a platform 14 that is adapted to support a notebook computer. In some embodiments, the body 12 and the platform 14 are unitarily formed form a single piece of material, such as a metal or plastic material. The body 12 comprises a planar base 16, planar front and rear walls 18 and 20 that extend upward from the base, and a planar top wall 22 that extends outward from the rear wall 20. In some embodiments, each of the base 16, front wall 18, rear wall 20, and top wall 22 are generally rectangular, the base and top wall are parallel to each other, and the front and rear walls are parallel to each other. Regardless, the body 12, and more particularly the base 16, front wall 18, and rear wall 20, form a cavity 25 in which a power adapter can be placed and supported.

In at least some embodiments, the platform 14 is also generally planar and rectangular and comprises a top surface 27. As shown in FIGS. 1 and 2, the platform 14 can extend perpendicularly outward from the front wall 18 of the body 12 so as to be generally parallel to the base 16 and the top wall 22. Although the platform 14 is adapted to support a notebook computer, its dimensions may be smaller than those of the computer. For example, the platform 14 can have width and length dimensions that are about half those of a notebook computer that it is intended to support. In some embodiments, the front wall 18 can comprise a reinforcement portion 24 adjacent the point at which the platform 14 meets the front wall. The reinforcement portion 24 provides reinforcement to the support tray 10 that may be necessary to support the weight of the notebook computer.

Extending upward from a top surface 26 of the top wall 22 are first coupling members in the form of mounting collars 28 that are adapted to receive other coupling members of another support tray, which may have identical construction to the support tray 10. In some embodiments, the collars 28 are generally cylindrical and define generally cylindrical inner spaces 30. Extending downward from a bottom surface 32 of the base 16 are second coupling members in the form of mounting posts 34. In some embodiments, the posts 34 are also generally cylindrical. Although two collars 28 and two posts 34 are shown in FIG. 1, alternative numbers of collars and posts can be used, if desired.

With particular reference to FIG. 2, the body 12 can further include a lateral end wall 36 that extends upward from the base 16 and between the front and rear walls 18, 20. When provided, the end wall 36 limits insertion of a power adapter into the cavity 25 to assist the user in aligning the adapter with the support tray 10 as well as a notebook computer supported by the tray.

Figure 3A:
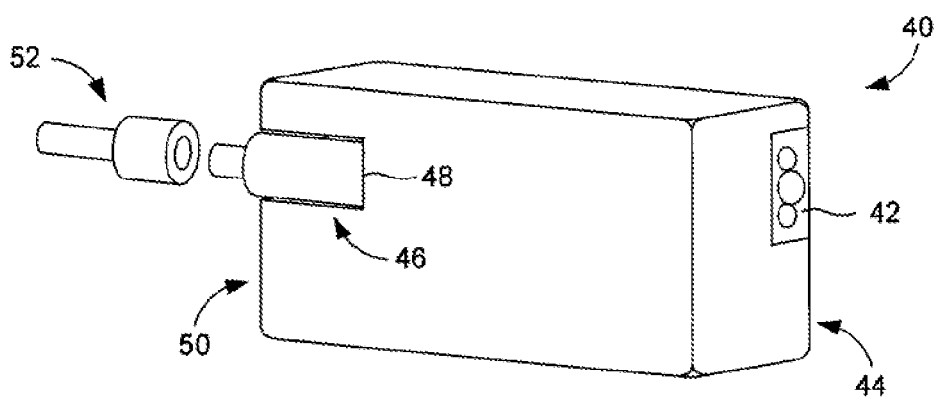
FIGS. 3A and 3B are perspective views of an embodiment of a power adapter adapted for use with the support tray of FIG. 1, the views respectively illustrating first and second orientations of a jack of the power adapter.
Figure 3B:
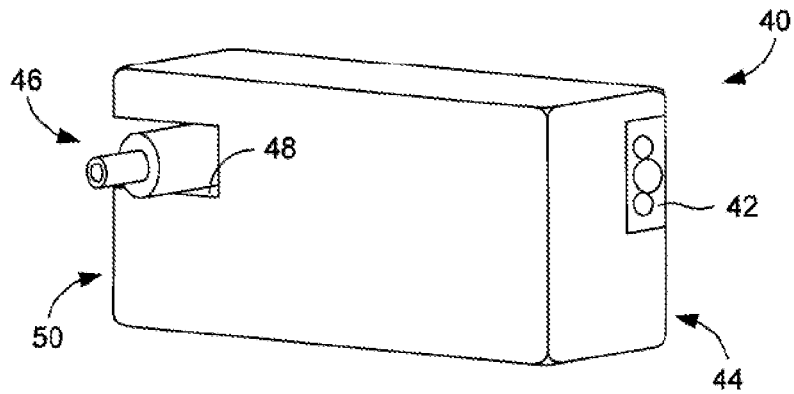

FIGS. 3A and 3B illustrate a power adapter 40 that can be used with the support tray 10. The power adapter 40 is generally brick shaped and therefore comprises a plurality of planar outer surfaces that are generally orthogonal to each other. A receptacle 42 is provided on a first end 44 of the adapter 40 that is adapted to receive a power cord (not shown) that can be plugged into a wall outlet to deliver AC power to the adapter. The power adapter 40 further includes an electrical connector or jack 46 that is adapted for direct connection with a notebook computer. Due to the provision of the jack 46, the power adapter 40 can be connected to the computer without a power cable that extends between the adapter and the computer.

The jack 46 is provided in a recess 48 that is, in some embodiments, provided at a second end 50 of the power adapter 40. The jack 46 is pivotally mounted within the recess 48 so that it can be oriented in a first, retracted position shown in FIG. 3A and a second, extended position shown in FIG. 3B. As is suggested by FIG. 3A, the jack 46 can be coupled to (e.g., received by) a power cable 52 when the jack is in the retracted position to enable conventional use of the power adapter 40. In such a case, the cable 52 can extend between the power adapter 40 and the computing device the adapter is used to charge. When the jack 46 is extended as in FIG. 3B, however, the power adapter 40 is prepared for use with the support tray 10 and the jack can be directly connected to (e.g., received by) the computing device without using the power cable 52.

Figure 4:
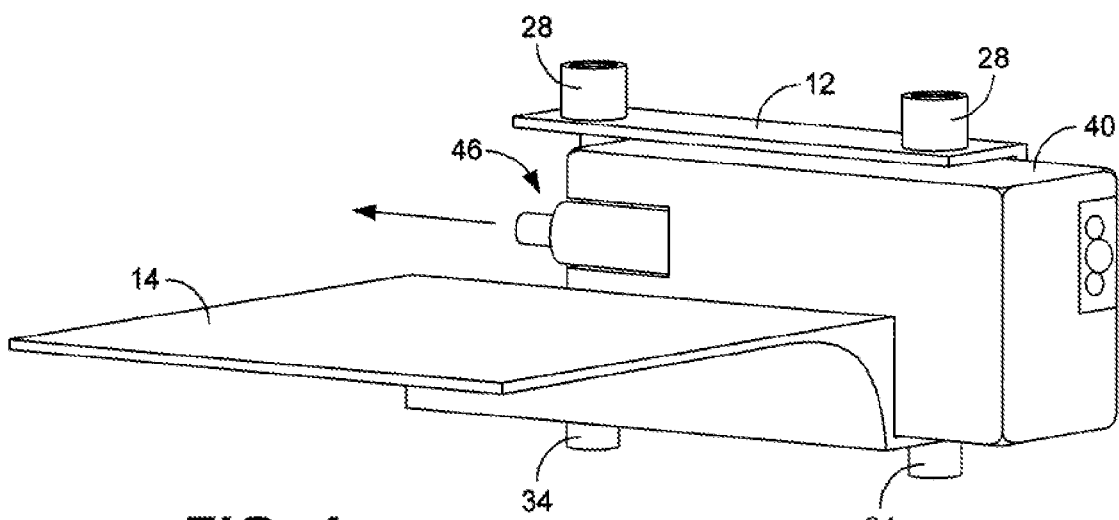
FIG. 4 is a perspective view of the support tray of FIG. 1 and the power adapter of FIGS. 3A and 3B, illustrating insertion of the power adapter into a recess of the support tray.

Referring next to FIG. 4, illustrated is insertion of the power adapter 40 of FIGS. 3A and 3B into the support tray 10 of FIGS. 1 and 2. As shown in FIG. 4, the power adapter 40 can be slid into the cavity 25 of the support tray 10 from a side edge of the body 12. In some embodiments, the power adapter 40 can be slid into the cavity 25 until the adapter abuts the end wall 36 identified in FIG. 3B. At that point, the ends of the power adapter 40 may be flush with the edges of the body 12 (see FIG. 5) and the jack 46 of the adapter may be desirably positioned for connection with a notebook computer.

Figure 5:
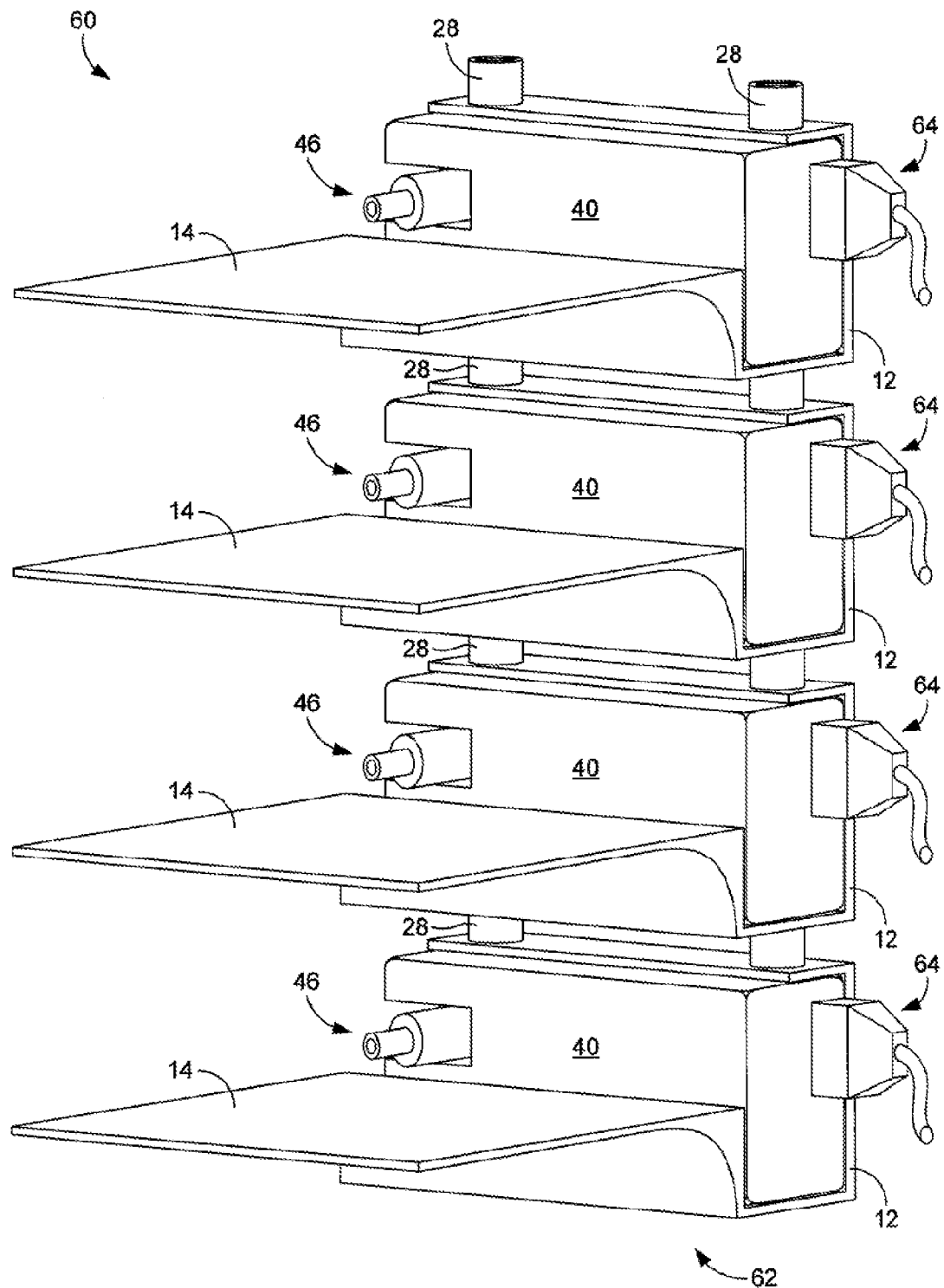
FIG. 5 is a perspective view of an embodiment of a notebook computer charging system formed from multiple support trays.

FIG. 5 illustrates a plurality of support trays 10 that have been stacked on top of each other to form a notebook computer charging system or station 60. To construct the charging station 60, the mounting posts 34 of upper support trays 10 are inserted into and received by mounting collars 28 of lower support trays 10. Optionally, the stack of support trays 10 can be supported by a stand (see FIG. 6) to which the bottom support tray 62 attaches. As is further shown in FIG. 5, a power supply 40 has been inserted into the cavity 25 of each support tray 10 and the jacks 46 have been pivoted to their extended positions such that the charging station 60 is ready for use in charging multiple notebook computers. In addition, power cords 64 have been connected to each adapter 40 to deliver AC power to the adapters.

Figure 6:
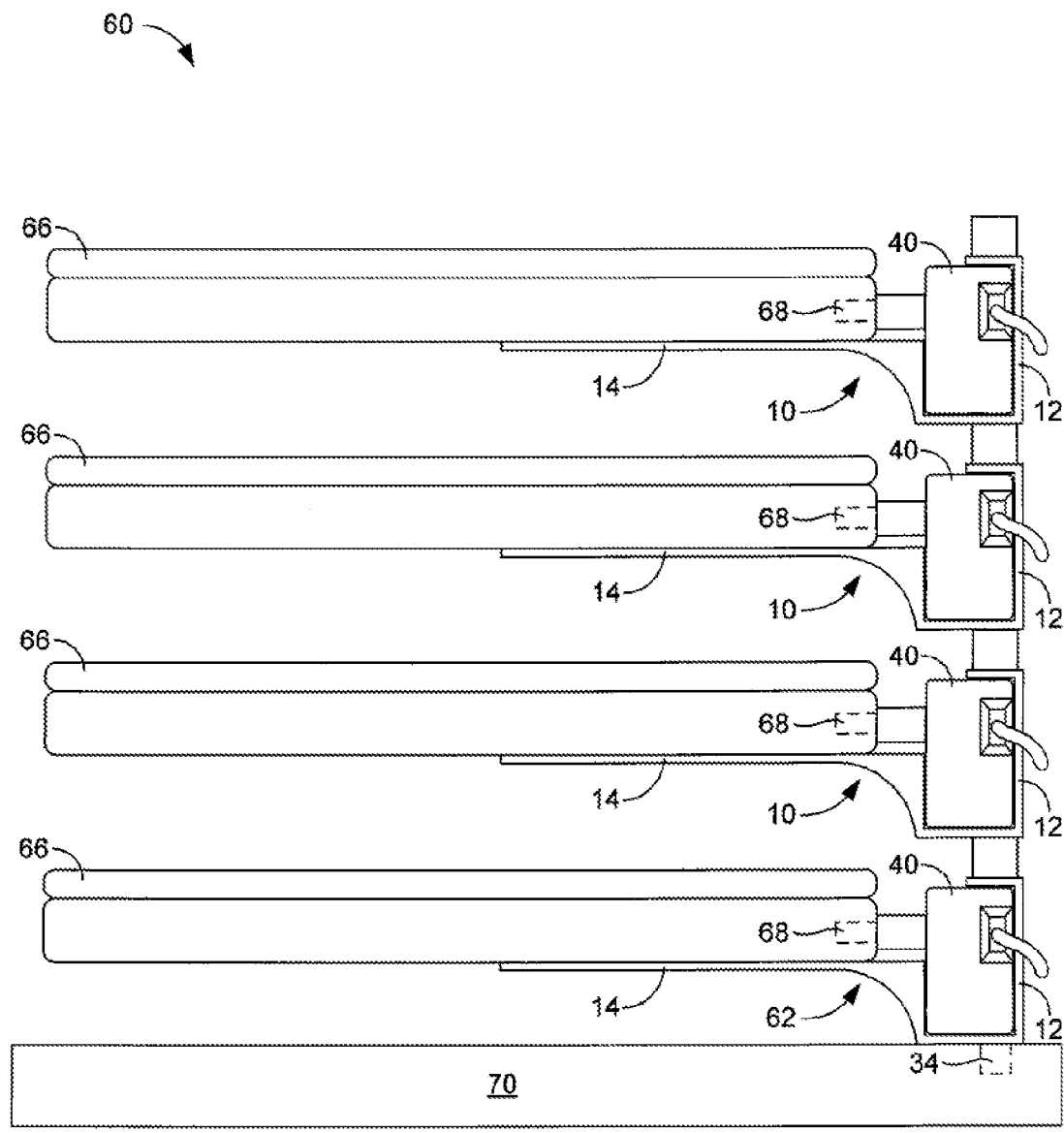
FIG. 6 is side view of the charging system of FIG. 5 in use in charging a plurality of notebook computers.

Referring next to FIG. 6, the charging station 60 is shown in use charging a plurality of notebook computers 66. As is apparent in FIG. 6, a notebook computer 64 has been placed on each support tray 10 and has been "backed into" the jack 46 of each associated power adapter 40. More particularly, the jacks 46 have been inserted into and received by receptacles 68 of the computers that typically receive the electrical connector of a power cable that extends from a power adapter. Given that the jacks 46 can be directly connected to the notebook computers 64, the user need not waste time and energy locating cables and plugging them into the computers. As is also apparent in FIG. 6, the bottom support tray 62 is mounted to a base 70, which may be placed on the floor or an appropriate horizontal surface, such as a tabletop. The bottom support tray 62 mounts to the base 70 with its mounting posts 34. In alternative embodiments, the base 68 can be connected to a vertical mounting member (not shown) that enables the charging station 60 to be mounted to a vertical surface, such as a wall or post. In further alternative embodiments, no base is provided and the support trays 10 are directly mounted to a vertical member or surface.

Although particular embodiments have been discussed in the foregoing, alternative embodiments are possible. In one such embodiment, the platform of each support tray can comprise an alignment feature, such as a stop, that assists the user in aligning the notebook computer with the power adapter jack.

The invention claimed is:

1. A support tray for supporting a notebook computer and an associated power adapter, the support tray comprising:
   a body including walls providing a cavity to removably receive the power adapter; and
   a platform extending out from the body, the platform being configured to support the notebook computer,
   wherein the body provides an opening through which an electrical connector of the power adapter extends to connect to the notebook computer without use of a power cable upon the notebook computer being placed on the platform and the power adapter being placed in the cavity.

2. The support tray of claim 1, wherein the walls providing the cavity comprise a base, a front wall, and a rear wall of the body.

3. The support tray of claim 2, further comprising a lateral end wall that extends up from the base that limits insertion of the power adapter into the cavity.

4. The support tray of claim 2, wherein the cavity is further defined by a top wall of the body.

5. The support tray of claim 1, further comprising a first mounting member extending from the body and configured to connect the support tray to a mounting member of a second support tray.

6. The support tray of claim 5, wherein the first mounting member extends upwardly from the body, the support tray further comprising a second mounting member that extends downwardly from the body, the second mounting member being configured to connect with a mounting member of a third support tray.

7. The support tray of claim 1, wherein the body and the platform are unitarily formed from a single piece of material.

8. The support tray of claim 1, wherein the opening is between the platform and the cavity.

9. A computer charging system comprising:
   multiple support trays stacked on top of each other, each support tray comprising:
      a body including walls providing a cavity to removably receive a power adapter, and
      a platform extending out from the body, the platform being configured to support a computer,
      wherein the walls of the body further provide an opening through which an electrical connector of the power adapter extends to connect to the computer without use of a power cable upon the computer being placed on the platform and the power adapter being placed in the cavity.

10. The charging system of claim 9, wherein the walls of the body of each support tray comprise a base, a front wall, a rear wall of the body, and a top wall.

11. The charging system of claim 10, wherein the body of each support tray further comprises a lateral end wall that that extends up from the base that limits insertion of the respective power adapter into the cavity.

12. The charging system of claim 9, wherein the body of each support tray comprises first mounting members that extend upwardly from the body, the first mounting members connected with mounting members of an adjacent upper support tray.

13. The charging system of claim 12, wherein the body of each support tray further comprises second mounting members that extend downwardly from the body, the second mounting members connected with mounting members of an adjacent lower support tray or a base of the charging system.

14. The charging system of claim 9, further comprising the power adapters supported by the respective support trays, each power adapter comprising a respective electrical connector configured to directly connect to a respective notebook computer such that the power adapters can be electrically connected to the notebook computers without use of respective power cables.

15. The charging system of claim 9, further comprising the power adapters adapter, wherein each electrical connector is pivotally mounted to the respective power adapter, each electrical connector pivotable from a first position to a second position, each computer connectable to the respective electrical connector in the second position, and each electrical connector in the first position connectable to a respective power cable connected to the respective computer.

16. The computer charging system of claim 9, wherein the opening is between the platform and the cavity.

17. A system comprising:
- a computer;
- a power adapter having an electrical connector; and
- a support tray separate from the computer, the support tray supporting the computer and the power adapter, the support tray comprising:
  - a body including walls providing a cavity in which the power adapter is removably placed; and
  - a platform extending out from the body, the computer placed on the platform,
  - wherein the body provides an opening through which the electrical connector of the power adapter extends to connect to the computer without use of a power cable.

18. The system of claim 17, further comprising:
- a second computer;
- a second power adapter; and
- a second support tray separate from the second computer, the second support tray supporting the second computer and the second power adapter, the second support tray comprising:
  - a body including walls providing a cavity in which the second power adapter is removably placed; and
  - a platform extending out from the body of the second support tray, the second computer placed on the platform of the second support tray.

19. The system of claim 17, wherein the electrical connector is pivotable with respect to the power adapter between a first position and a second position, the electrical connector in the first position connectable to the computer through the opening, and the electrical connector in the second position facing toward a side away from the opening.

\* \* \* \* \*

UNITED STATES PATENT AND TRADEMARK OFFICE
CERTIFICATE OF CORRECTION

| | | |
|---|---|---|
| PATENT NO. | : 8,665,593 B2 | Page 1 of 1 |
| APPLICATION NO. | : 13/054830 | |
| DATED | : March 4, 2014 | |
| INVENTOR(S) | : Jeffrey A. Lev et al. | |

It is certified that error appears in the above-identified patent and that said Letters Patent is hereby corrected as shown below:

In the Claims

In column 4, line 46, in Claim 11, delete "that that" and insert -- that --, therefor.

In column 4, line 67, in Claim 15, after "power" delete "adapters".

Signed and Sealed this
Twenty-fourth Day of June, 2014

Michelle K. Lee
*Deputy Director of the United States Patent and Trademark Office*